W. W. PRICE.
COMBINED LANTERN AND DINNER-KETTLE.

No. 170,110. Patented Nov. 16, 1875.

Witnesses:
George W. M<sup>c</sup>Cready.
D. A. Blakney.

Inventor;
Warran Wortman Price

UNITED STATES PATENT OFFICE.

WARRAN WORTMAN PRICE, OF PETITCODIAC, CANADA.

IMPROVEMENT IN COMBINED LANTERNS AND DINNER-KETTLES.

Specification forming part of Letters Patent No. 170,110, dated November 16, 1875; application filed March 18, 1875.

*To all whom it may concern:*

Be it known that I, WARRAN WORTMAN PRICE, of the village of Petitcodiac, in the county of Westmoreland and Province of New Brunswick, Canada, have invented a new and useful Article by Combining a Lantern with a Dinner-Kettle; and I do hereby declare that the following is a full, clear, and exact description of the same.

In designing this combination I had two objects in view—the first to provide for all those who have occasion to labor or travel in the cold such a useful combination of two implements in common use that food or drink might either be kept warm or heated whenever required; and, second, to furnish all the conveniences and benefits of a lantern by the same combination. The description which follows will show how conveniently and efficiently those desirable purposes are accomplished.

Figure 1:
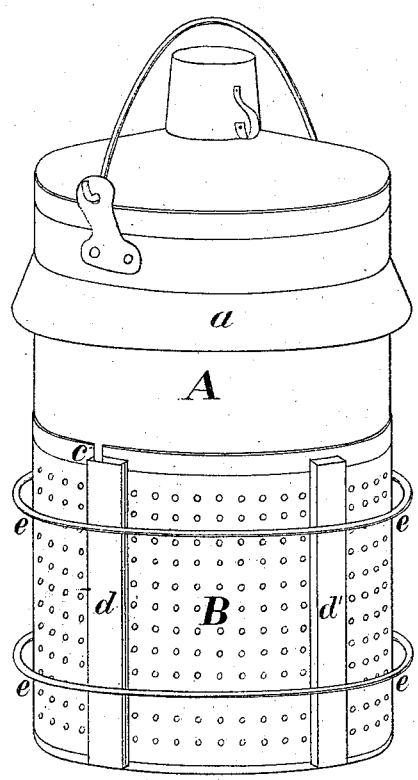
Figure 2:
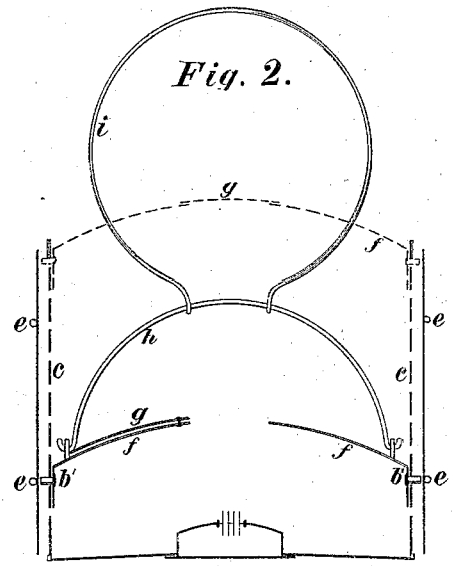
Figure 4:
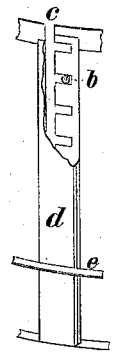
Figure 3:
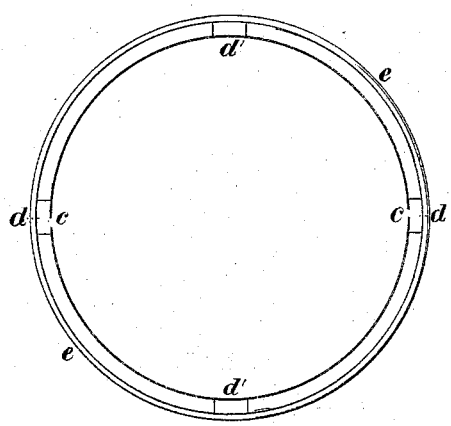

In the accompanying drawings, Figure 1 is a perspective view of the lantern and kettle combined. Fig. 2 represents a vertical section through $d\ d$ of the lantern. Fig. 3 represents a horizontal section through one of the planes $e\ e$. Fig. 4 is a side view of one of the openings, with part of the covering $d$ removed; and Fig. 5 is a plan view of the regulating-cover $f$.

Similar letters of reference indicate corresponding parts in the several figures.

A represents a dinner-kettle, such as is ordinarily used by laboring-men. For the purpose of the combination, two short studs, $b\ b$, are fixed upon opposite sides, near the bottom, one of them being shown in Fig. 4. The kettle is also surrounded by a flange, $a$, forming a tight joint at the upper edge, and inclining outward at the bottom. The lantern is cylindrical in form, made of perforated tin or other suitable metal, with a lamp fixed in or upon the bottom. The size of the lantern is such that the kettle will just fit neatly within it. On opposite sides are narrow openings, $c\ c$, extending downward from the top, and each having a number of notches at one side. When the lantern is placed within the kettle the studs $b\ b$ slide down the openings $c\ c$ to the required depth, when a turn of the kettle brings them within one pair of the notches, as shown in Fig. 4. The openings $c\ c$, protected by tubular coverings $d\ d$, give the necessary ventilation to the lantern, while the escaping gas or smoke is prevented from rising round the upper part of the kettle by the projecting flange $a$. Additional strength and protection to the lantern are afforded by bands at the top and bottom, and by a number of hoops, $e\ e$, surrounding and being securely fastened to the forementioned flues $d\ d$, and two other similar vertical tubes or pockets, $d'\ d'$, attached to the lantern at ninety degrees from the former. The last-named tubes may be found useful to carry a knife and fork or some other article of convenience. Within the lantern is a regulating-cover, $f$, made of a perforated rim or hoop and top plate, and furnished with handles $h$ and $i$, which, when not in use, are thrown down upon the cover, as in Fig. 5. At opposite sides of the rim are two studs, $b\ b$, similar to those in the kettle, which also slide within the openings $c\ c$, and in like manner may be turned into any pair of the notches. In the center of the cover is an opening, which may be closed, whenever required, by a trencher, $g$, fastened by a rivet.

Figure 5:
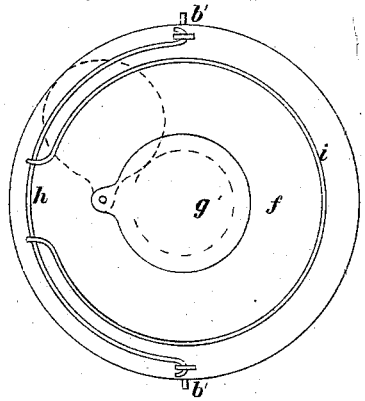

In a combination the trencher is usually set to one side, as shown by the dotted line in Fig. 5. This cover may be pushed down to the bottom of the lantern or fixed at any height between that and the bottom of the kettle, so as best to answer the purpose of a regulator to the draft of the lamp.

It need scarcely be added that this regulating-cover $f$ may be made a true cover to the lantern (when the kettle is not required) by closing the central opening with the trencher $g$, and turning the studs $b\ b$ into the upper notches of the side openings $c\ c$.

Having thus described my invention, I claim as new and desire to secure by Letters Patent—

1. The flange $a$ and studs $b\ b$, in combination with the tubes $d\ d$, provided with notched vertical slots $c\ c$, as hereinbefore specified.

2. The combination of the hoops $e\ e$ with the tubes $d'\ d'$ and slotted tubes $d\ d$, substantially as described.

3. The regulating-cover $f$, provided with studs $b'\ b'$, handles $h$ and $i$, and trencher $g$, as hereinbefore set forth.

Petitcodiac, N. B., March 2, 1875.

WARRAN WORTMAN PRICE.

Signed in presence of—
GEORGE W. MCCREADY,
D. A. BLAKNEY.